Oct. 28, 1958      D. W. BLOSER      2,858,392
MOTOR SPEED CONTROL APPARATUS
Filed June 7, 1955      2 Sheets-Sheet 1
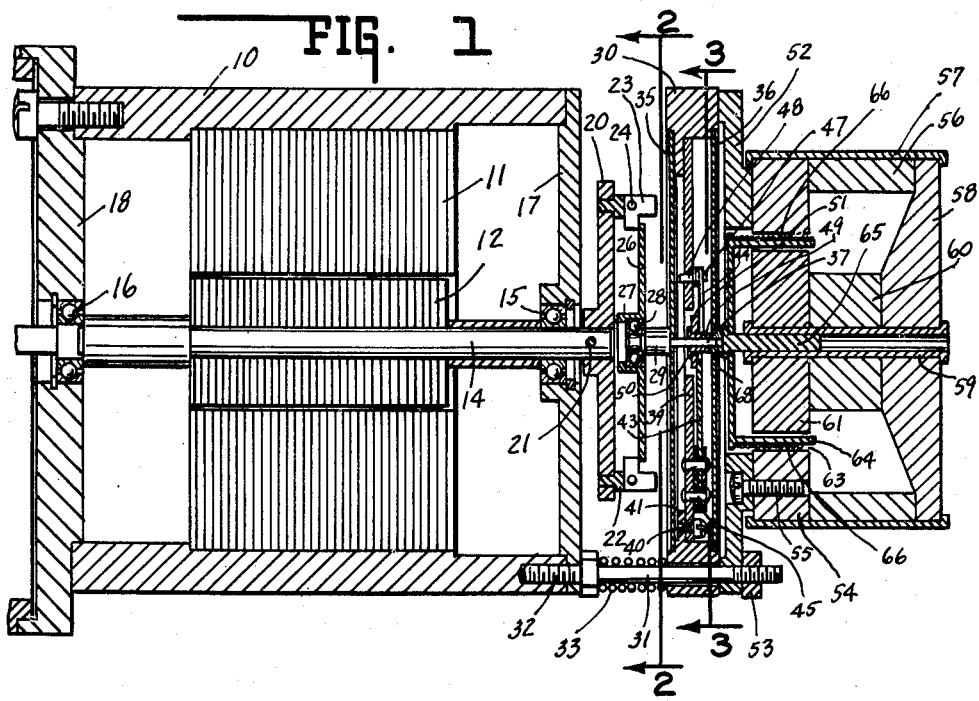
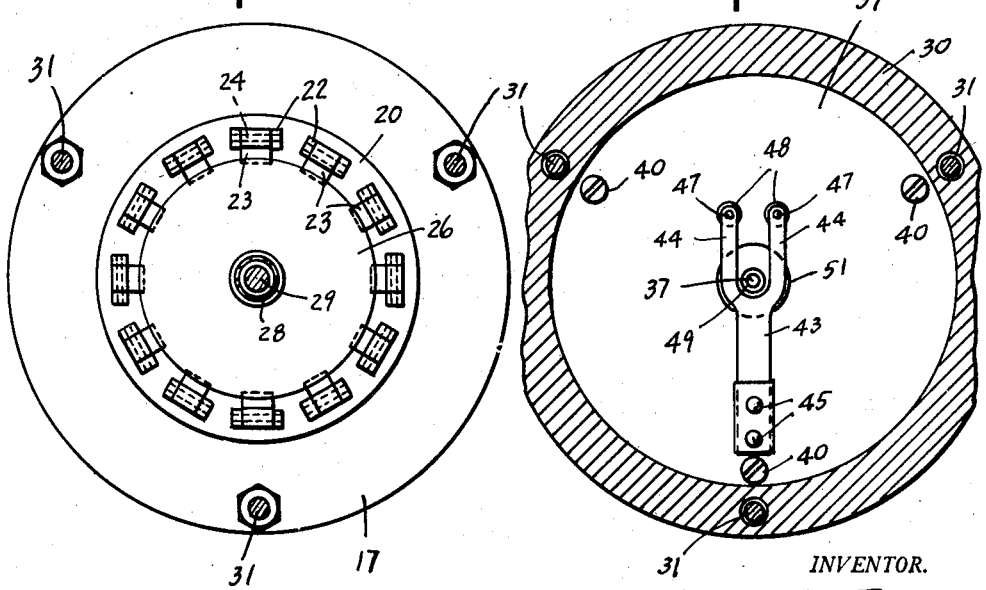
INVENTOR.
DWIGHT W. BLOSER.
BY
Lockwood, Galt, Woodard & Smith
ATTORNEYS.

Oct. 28, 1958   D. W. BLOSER   2,858,392
MOTOR SPEED CONTROL APPARATUS
Filed June 7, 1955   2 Sheets-Sheet 2

INVENTOR.
DWIGHT W. BLOSER.
BY
Lockwood, Galt, Woodard + Smith.
ATTORNEYS.

United States Patent Office 2,858,392
Patented Oct. 28, 1958

2,858,392

MOTOR SPEED CONTROL APPARATUS

Dwight W. Bloser, Oradell, N. J., assignor, by mesne assignments, to Daystrom, Incorporated, Murray Hill, N. J., a corporation of New Jersey Application June 7, 1955, Serial No. 513,872

5 Claims. (Cl. 200—80)

This invention relates generally to motor speed control apparatus, and more particularly to cooperating mechanical and electrical apparatus for providing variable speed control of an electrical motor.

Conventional speed controlling apparatus for electrical motors comprises fly-ball governing devices adapted to vary rheostats or potentiometers connected to the motor windings, or they comprise fly-ball governers adapted to connect and disconnect one winding of the motor after another in order to maintain constant speed of rotation. Such speed control devices do not include any adjustable means whereby the speed of a given motor may be pre-set and maintained at a pre-set value. Also, conventional speed control devices do not include the facilities whereby the speed may be pre-set from a remote point and thereafter maintained at the pre-set value.

The principal object of this invention is to provide speed controlling apparatus for an electrical motor wherein the speed may be adjustably pre-set and maintained at pre-set value.

Another object of this invention is to provide automatic speed control apparatus for electric motors wherein the speed may be pre-set from a remote point and maintained at the pre-set value.

Still another object of this invention is to provide a mechanical governing device responsive to the speed of rotation of an electric motor and a remotely controllable electrical means operable to vary the speed which said governor will maintain at constant value.

In accordance with this invention there is provided in combination with an electric motor a fly-weight governor, electrical contacts connected in the supply circuit of the electric motor and arranged to be opened and closed by said governor, and an electromagnetic device adjustable to exert variable forces in opposition to those generated by said governor for changing the speed at which said governor will be operative to actuate said contacts.

In accordance with another feature of this invention there is provided a mechanical speed governing device responsive to the speed of rotation of a motor for controlling its speed, and an electromagnetic device for changing the speed of rotation of said motor at which said governor shall be effective.

The full nature of the invention will be understood from the accompanying drawings and the following description and claims:

Fig. 1 is a longitudinal cross section of a conventional electric motor and the governing apparatus as provided in accordance with this invention.

Fig. 2 is a cross section taken on line 2—2 of Fig. 1.

Fig. 3 is a cross section taken on line 3—3 of Fig. 1.

Figure 4:
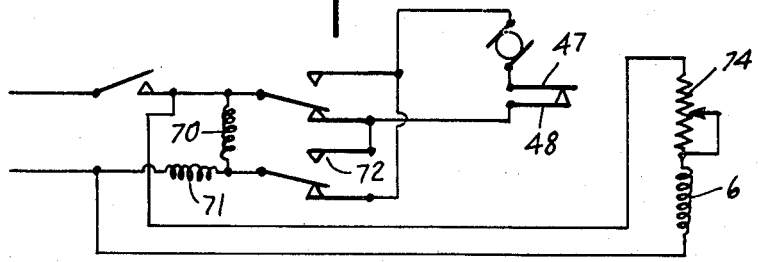
Fig. 4 is a circuit diagram illustrating the application of this invention to a direct current motor.

Referring to the drawings, this invention may be applied to a conventional electrical motor having a cylindrical frame 10, a stator 11, a rotor 12 and a shaft 14 rotatably mounted in bearings 15, 16 conventionally supported in end plates 17 and 18, respectively.

One end of shaft 14 may project outwardly of the bearing 15 and end plate 17 for supporting a disc 20 which may be pinned, as at 21, to rotate with shaft 14. A plurality of brackets 22, for example twelve, may be mounted on disc 20 adjacent its periphery and fixed relative thereto in any conventional manner. A corresponding plurality of L-shaped weights 23 may be pivotally mounted as at 24 on each of the brackets 22. When the motor is not rotating, the weights 23 assume the position illustrated in the drawing, where one arm of the weight is horizontal and the other vertical, the vertical arm extending radially inward into contact with the outer portion of a bearing plate 26 having a hub 27 within which is supported a ball bearing assembly 28. The disc 26 may be supported on the outer reduced end of a shaft 29, whereby the weights 23 tend to rotate about their pivots 24 during rotation of the motor, thereby to exert a thrust on disc 26 and bearing 28 tending to move the shaft 29 to the right (Fig. 1).

A ring member 30 may be supported on a plurality of stud bolts 31 which in turn are mounted in the motor frame 10, as shown at 32. A spring 33 may be provided on the bolts 31 for permitting a slight degree of motion of ring 30 on the stud bolts 31. The ring member 30 supports a pair of spaced metallic diaphragms 35 and 36, through which projects the right hand reduced end 37 of shaft 29 whereby shaft 29 is supported for axial movement. An insulating switch plate 39 may be fastened by means of machine screws 40 to an inner flange 41 of ring 30. The switch plate 39 supports a Y-shaped spring member 43 riveted to plate 39 by means of the rivets 45. The legs 44 of the spring 43 support electrical contact members 47 adapted to cooperate with other electrical contact members 48 mounted in the switch plate 39. The spring 43 may be tensioned normally to close or open contacts 47 with respect to contacts 48, these contacts and spring 43 being a part of the motor circuit, whereby opening and closing of the contacts may break and make the motor circuit or shunt one of the motor windings.

In order that the mechanical governor mechanism may open and close contacts 47 and 48, there is provided a sleeve member 49 fixed to the reduced end 37 of shaft 29. Sleeve 49 includes a flange 50, and a pad 51 is mounted between the flange 50 and the spring 43, whereby motion of shaft 29 to the right serves to open contacts 47, 48, while motion of shaft 29 to the left permits contacts 47 and 48 to close.

In order to control the motor speed at which the mechanical governor will be effective to open and close contacts 47 and 48, there is provided an electromagnetic device comprising a magnet supporting plate 52, also mounted on the outer ends of the stud bolts 31 and clamped in position by means of nuts 53. An outer core member 54 of relatively soft iron and annular in form may be mounted on plate 52 by means of machine screws 55. A permanent magnet 56 of annular form may be clamped to the outer portion of core 54 by means of a cylindrical retainer 57 having its marginal portions bent over the outer edge of core 54 and the outer edge of a yoke plate 58. Plate 58 supports at its center a tubular retainer member 59 on which is mounted a central permanent magnet member 60 and an inner core member 61 of relatively soft iron. The ends of retainer 59 may be spun over to form flanges, thereby to clamp magnet 60 and core 61 into fixed position centrally of the plate 58 and the outer core 54.

The outer core 54 is annular in form, and the inner core 61 is in the form of a circular disc having a diameter somewhat less than the inner diameter of core 54, thereby to provide an air gap at 63. The electromagnetic device 54, 56, 58, 60, 61 and 66 is similar to the conventional electro dynamic loud speaker motor wherein permanent magnets 56 and 60 cause flux to cross air gap 63 for providing an armature. A coil supporting cup 64 is supported to extend into air gap 63 by means of a non-magnetic cup staff 65 fastened rigidly to the center of the bottom of cup 64 and extending within tubular retainer 59 to provide sliding support for cup 64. A coil 66 may be wound on the cylindrical portion of cup 64 and energized with variable amounts of direct current. Thus, the turns of coil 66 are disposed in the flux path in air gap 63, whereby the higher the current flow in coil 66, the more force is exerted on cup 64, tending to move it away from the electromagnet and in opposition to the forces exerted on shaft 29 by weights 23. For transmitting this force there is provided a thrust bushing 68 mounted on the outer end of portion 37 of shaft 29 between the end of the cup 64 and the diaphragm 36. Thus, the coil 66 and cup 64 tend to push the diaphragm 36 inwardly into contact with the sleeve 49 and thus tend to permit contacts 47 and 48 to close. Diaphragms 35 and 36 provide restorative forces tending to hold the various parts in a normal position as shown in Fig. 1.

Fig. 4 illustrates a typical direct current motor circuit which shows for purposes of illustration a shunt field winding 70 and a series field winding 71, it being understood that these two windings may be used alternatively for purposes of explaining this invention. The usual reversing switch 72 may be connected between the power supply circuit and the armature winding. Its operation is well known, and no explanation is deemed necessary. For controlling the speed of the motor, the contacts 47 and 48 shown in Fig. 1 are connected in series with the armature winding. The coil 66 and a rheostat 74 are connected in series with one another across the supply lines. Thus, rheostate 74 may be adjusted to provide variable amounts of current in coil 66, thereby causing coil 66 to oppose the action of weights 23 with varying forces. When contacts 47 and 48 open, the armature naturally slows down until the weights 23 of the mechanical governor move inwardly sufficiently to permit shaft 29 to move to the left and to close contacts 47 and 48 for re-energizing the armature.

Figure 5:
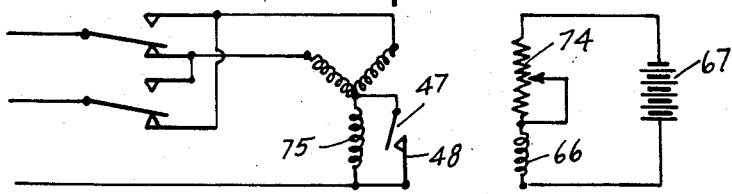
Fig. 5 is a circuit diagram illustrating the application of this invention to a three-phase alternating current motor.

Fig. 5 illustrates the application of the invention to a three-phase alternating current motor, wherein the switch contacts 47 and 48 may be closed to short circuit one of the motor windings 75. In this case the contacts 47 and 48 are normally opened and would be closed when the weights 23 move outwardly.

Figure 6:
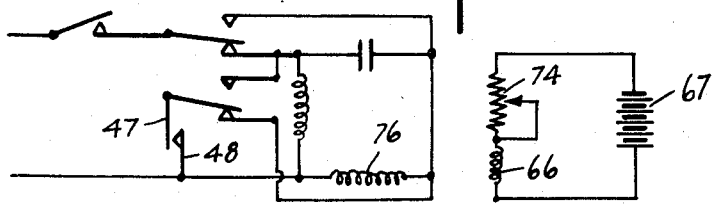
Figs. 6 and 7 are circuit diagrams illustrating the application of this invention to a two-phase alternating current motor.

Fig. 6 illustrates the application of the invention to a two-phase motor where the contacts 47, 48 are normally open and are closeable by weights 23 to short circuit one of the windings 76 of the two-phase motor, thereby to slow it down.

Figure 7:
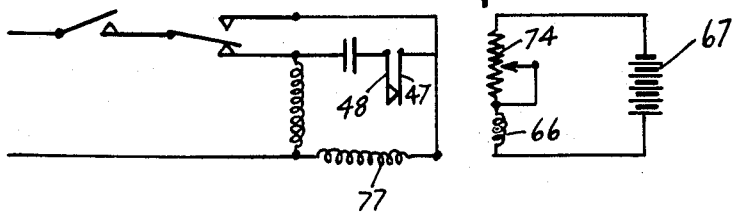

Fig. 7 illustrates an alternative application of the invention to a two-phase motor circuit, wherein the contracts 47 and 48 are normally closed and may be opened by the weights 23 to open the circuit of winding 77, thereby to slow down the motor.

In operation the rheostat 74 in any one of the circuits shown in Figs. 4, 5, 6 and 7 may be calibrated to provide predetermined motor speeds at various settings. Thus, when a certain amount of direct current flows through the coil 66 from battery 67, its reaction in the unidirectional flux field in air gap 63 causes coil 66 to exert a certain opposing force proportional to the current through the coil. The force exerted by the weights 23 through disc 26 and shaft 29 is proportional to the speed of rotation of the motor. When the force exerted by the weights exceeds the force exerted by the coil, disc 26 and shaft 29 will open or close contacts 47 and 48, depending upon the type of motor. As shown in Figs. 4, 5, 6 and 7, a motor winding will either be short circuited or opened by operation of contacts 47, 48, thereby to cause the motor to slow down. When the motor slows down sufficiently that coil 63 overcomes the force exerted by weights 23, the contacts will be restored to re-energize the motor, causing it to increase its speed. Therefore, the speed of the motor is held within the limits established by the setting of rheostat 74.

The mounting of the switch parts between diaphragms 35 and 36 offers important advantages over the conventionally mounted switches in the open. The diaphragms 35 and 36 may be hermetically sealed about their peripheries to ring 30 and at their center to shaft 29 and to bushing 68. The hermetically sealed space may be filled with oil to eliminate arcing and thus make contact life indefinite. Since shaft 29 is firmly fastened to the diaphragms it acts as a support as well as a bearing and there is essentially zero friction involved in the motion of shaft 29. Hence more accurate operation is obtained, particularly at low speeds.

Adjustment of rheostat 74 provides an infinite number of centrifugally controlled motor speeds and it will readily be apparent that rheostat 74 may be located remotely with respect to motor 10, whereby accurate motor speed control may be had from a remote point.

From the foregoing description it will be apparent that this invention provides infinite speed control of electric motors, either at the motor location or remotely therefrom. While the disclosed embodiment of the invention shows specific structure of a particular mechanical governing apparatus and a particular electromagnetic control device, it will be obvious to those skilled in the art that various other types of mechanical governors and electromagnetic devices are applicable and can be substituted within the spirit of the invention.

The invention claimed is:

1. Speed control apparatus for a motor having a shaft comprising a governor having a plurality of fly-weights mounted with respect to said shaft to move their mass outwardly in respect to said shaft in response to rotation of said shaft, a switch assembly comprising a pair of spaced diaphragms, a switch shaft mounted in said diaphragms for restraint axially of said switch shaft by said diaphragms, a disc mounted on said switch shaft and extending into the path of movement of said fly-weights whereby said switch shaft moves axially in response to movement of said weights, a spring-contact motor switch disposed between said diaphragms and connected with said switch shaft to be opened and closed by said switch shaft, and an electromagnet including a movable coil adapted to be energized to varying degrees, said coil being disposed relative to said switch shaft to exert force on said switch shaft in opposition to forces exerted by said fly-weights in proportion to varying degrees of energization of said coil.

2. Speed control apparatus for a motor having a shaft comprising a governor having a plurality of fly-weights mounted with respect to said shaft to move their mass outwardly in respect to said shaft in response to rotation of said shaft, a switch assembly comprising a pair of spaced diaphragms, a switch shaft mounted in said diaphragms for restraint axially of said switch shaft by said diaphragms, a disc mounted on said switch shaft and extending into the path of movement of said fly-weights whereby said switch shaft moves axially in response to movement of said weights, a motor switch having contacts disposed between said diaphragms and connected with said switch shaft to be opened and closed by said switch shaft, and an electromagnet adapted to be energized to varying degrees and including an armature disposed relative to said switch shaft to engage said switch shaft in opposition to forces exerted by said fly-weights in proportion to varying degrees of energization.

3. Speed control apparatus for a motor having a shaft comprising a governor having a plurality of fly-weights mounted with respect to said shaft to move their mass outwardly in respect to said shaft in response to rotation of said shaft, a switch assembly comprising a reciprocable shaft, a disc rotatably mounted on said reciprocable shaft and extending into the path of movement of said fly-weights whereby said reciprocable shaft moves axially in response to movement of said weights, a motor switch connected with said reciprocable shaft to be opened and closed thereby and an electromagnet including a moving coil armature disposed relative to said reciprocable shaft to engage said reciprocable shaft in opposition to forces exerted by said fly-weights in proportion to varying degrees of energization of said coil.

4. Speed control apparatus for a motor having a shaft comprising a centrifugal governor responsive to rotation of said shaft, a switch assembly comprising a non-rotatable and reciprocable switch shaft, a rotatable connection between said switch shaft and said governor for converting rotary motion of said governor to linear motion whereby said switch shaft reciprocates under the control of said governor, a motor switch connected with said switch shaft to be opened and closed by linear motion of said switch shaft, and an electromagnet including an armature having a moving coil disposed relative to said switch shaft to exert linear force on said switch shaft in opposition to force generated by said governor and in proportion to varying degrees of energization of said coil.

5. Speed control apparatus for a motor having a shaft comprising a centrifugal governor responsive to rotation of said shaft, a motor switch comprising a pair of spaced diaphragms, a switch shaft mounted in said diaphragms for restraint axially of said switch shaft by said diaphragms, said switch shaft being operatively associated with said governor for axial movement thereby, a motor switch having contacts supported between said diaphragms and connected with said switch shaft to be opened and closed thereby, and electromotive means operatively associated with said switch shaft for exerting forces on said switch shaft in opposition to forces exerted by said governor in proportion to varying degrees of energization of said electromotive means.

References Cited in the file of this patent

UNITED STATES PATENTS

| | | |
|---|---|---|
| 267,446 | Mott | Nov. 14, 1882 |
| 2,021,196 | Oldham | Nov. 19, 1935 |